(12) United States Patent
Liu et al.

(10) Patent No.: US 6,693,154 B2
(45) Date of Patent: Feb. 17, 2004

(54) TRANSITION METAL CATALYSTS FOR OLEFIN POLYMERIZATION

(75) Inventors: Jia-Chu Liu, Mason, OH (US); Jonathan L. Schuchardt, Royersford, PA (US)

(73) Assignee: Equistar Chemicals, LP, Houston, TX (US)

( * ) Notice: Subject to any disclaimer, the term of this patent is extended or adjusted under 35 U.S.C. 154(b) by 238 days.

(21) Appl. No.: 09/947,745

(22) Filed: Sep. 6, 2001

(65) Prior Publication Data

US 2003/0065113 A1 Apr. 3, 2003

(51) Int. Cl.[7] .............. C08F 4/52; C08F 4/70; C08F 4/62
(52) U.S. Cl. .......... 526/134; 526/141; 526/147; 526/161; 526/169.1; 526/172; 502/103; 502/117; 502/167
(58) Field of Search .......... 502/103, 117, 502/167; 526/169.1, 161, 172, 134, 141, 147

(56) References Cited

U.S. PATENT DOCUMENTS

| | | | |
|---|---|---|---|
| 3,287,334 A | 11/1966 | Kropa | 260/86.7 |
| 4,115,397 A | 9/1978 | Siegl | 260/296 T |
| 4,326,084 A | 4/1982 | Druliner et al. | 568/360 |
| 4,482,746 A | * 11/1984 | Hermolin | 568/342 |
| 4,499,305 A | * 2/1985 | Hermolin | 568/342 |
| 4,568,769 A | * 2/1986 | Yashima et al. | 568/342 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,648,440 A | 7/1997 | Sugano et al. | 526/132 |
| 5,714,556 A | 2/1998 | Johnson et al. | 526/135 |
| 5,866,663 A | 2/1999 | Brookhart et al. | 526/170 |
| 5,955,555 A | 9/1999 | Bennett | 526/133 |
| 6,211,311 B1 | 4/2001 | Wang et al. | 526/131 |

FOREIGN PATENT DOCUMENTS

WO  WO 99/12981  3/1999

OTHER PUBLICATIONS

Siegl, W., J. Org. Chem. 42 (1977) 1872–1878.*
Gagne et al., Inorg. Chem. 23 (1984) 65–74.*
R. Gagne et al., *Inorg. Chem. 23* (1984) 65.
R. Gagne et al., *Inorg. Chem. 20* (1981) 3260.
W. Siegl, *J. Organometal. Chem. 107* (1976) C27.
C. Tolman et al., *J. Mol. Catal. 48* (1988) 129.
W. Siegl, *Inorg. Nucl. Chem. Letters 10* (1974) 825.
D. Baird et al., *Polyhedron 8* (1989) 2359.
D. Baird et al., *Polyhedron 10* (1991) 229.
W. Siegl, *J. Org. Chem. 42* (1977) 1872.
S. Ittel et al., *Chem. Rev. 100* (2000) 1169.
*Chem. & Eng. News*, Apr. 13, 1998, p. 11.
A. Bennett, *Chemtech*, Jul. 1999, p. 24.
G. Britovsek et al., *Chem. Commun.* (1998) 849.
B. Small et al., *J. Am. Chem. Soc. 120* (1998) 4049.
G. Long et al., *Can. J. Chem. 79* (2001) 1026–1029.
Jap. Publ. No. 08217703 (Abstract) (published Aug. 27, 1996).
E. Sadek et al., *Macromol. Chem. Phys. 202* (2001) 1505.

* cited by examiner

Primary Examiner—Roberto Rabago
(74) Attorney, Agent, or Firm—Jonathan L. Schuchardt

(57) ABSTRACT

A catalyst system useful for polymerizing olefins is disclosed. It comprises an activator and an organometallic complex. The complex includes a Group 3-10 transition or lanthanide metal and a 1,3-bis(arylimino)isoindoline or 1,3-bis(heteroarylimino)isoindoline ligand. Activities of the Group 8-10 catalyst systems rival or exceed those of late transition metal bis(imines). The resulting polyolefins typically have high molecular weights, broad molecular weight distributions, and a high degree of crystallinity, which makes them valuable for film applications.

19 Claims, No Drawings

TRANSITION METAL CATALYSTS FOR OLEFIN POLYMERIZATION

FIELD OF THE INVENTION

The invention relates to catalyst systems useful for polymerizing olefins. In particular, the invention relates to transition metal catalysts that are easy to make and have exceptional activities.

BACKGROUND OF THE INVENTION

"Single-site" and metallocene catalysts continue to lure polyolefin producers because of the unique performance attributes of the catalysts and polymers made from them. Since the late 1990s, olefin polymerization catalysts that incorporate late transition metals (especially iron, nickel, or cobalt) and bulky α-diimine ligands (or "bis(imines)") have been extensively studied and described by scientists at DuPont, the University of North Carolina at Chapel Hill, Imperial College of London University, and BP Chemicals. Late transition metal catalysts are of interest because they can be highly active and, unlike traditional early transition metal-based metallocenes, they can tolerate and incorporate polar comonomers. (For a few examples, see Chem. & Eng. News, Apr. 13, 1998, p. 11; Chemtech, Jul. 1999, p. 24; Chem. Commun. (1998) 849; J. Am. Chem. Soc. 120 (1998) 4049; Chem. Rev. 100 (2000) 1169; PCT Int. Publ. WO 99/12981; and U.S. Pat. Nos. 5,866,663 and 5,955,555.)

The bis(imine) complexes described above, when used with an activator, efficiently polymerize olefins, but more active catalysts are desirable because using less catalyst to make the same amount of polyolefin reduces cost. Moreover, the variety of polymers available from the bis(imine) complexes explored so far is somewhat limited.

In 1977, Walter Siegl reported a remarkably simple synthetic route to 1,3-bis(heteroarylimino)isoindolines from phthalonitriles using alkaline earth salts and transition metals to facilitate the reaction via a template effect (*J. Org. Chem.* (1977) 42 1872). The reaction of phthalonitrile with two equivalents of 2-aminopyridine is illustrative:

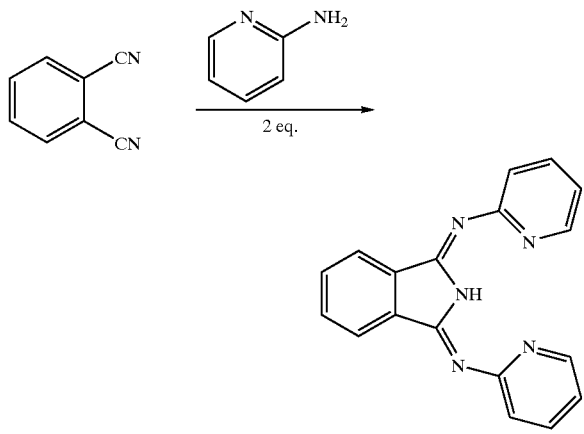

Soon after Siegl's report, scientists at DuPont and Sumitomo Chemical used complexes that incorporate a Group 8 metal and one or more 1,3-bis(heteroarylimino)isoindoline ligands to catalyze the decomposition of cyclohexanehydroperoxide to cyclohexanol and cyclohexanone, which are key intermediates for making adipic acid. See, for example, U.S. Pat. Nos. 4,499,305, 4,482,746, and 4,568,769. Ruthenium complexes of 1,3-bis(2-pyridylimino)isoindoline are known to oxidize alcohols (see *Inorg. Chem.* 23 (1984) 65).

Despite their known utility for hydroperoxide decompositions, transition metal complexes that incorporate 1,3-bis(heteroarylimino)-isoindoline ligands have not been previously explored as catalysts for olefin polymerization reactions. Moreover, transition metal complexes from 1,3-bis(arylimino)isoindolines, i.e., condensation products of phthalimide and two equivalents of an aniline, have apparently not been used at all to catalyze organic reactions.

SUMMARY OF THE INVENTION

The invention is a catalyst system useful for polymerizing olefins. The catalyst system comprises an activator and an organometallic complex. The complex comprises a Group 3-10 transition or lanthanide metal and a 1,3-bis(arylimino)isoindoline or 1,3-bis(heteroarylimino)-isoindoline ligand.

We surprisingly found that catalyst systems of the invention are valuable for polymerizing olefins. In particular, the late transition metal catalysts have activities that rival or even exceed, sometimes by a wide margin, those of late transition metal bis(imines). The resulting polyolefins typically have high molecular weights, broad molecular weight distributions, and a high degree of crystallinity, attributes that make them exceptionally useful for film applications.

DETAILED DESCRIPTION OF THE INVENTION

Catalyst systems of the invention are useful for polymerizing olefins. They comprise an organometallic complex and an activator. The activator interacts with the complex to produce a catalytically active species. The complex includes a Group 3-10 transition or lanthanide metal and an isoindoline ligand.

Preferably, the complex includes a Group 8-10 transition metal, i.e., iron, cobalt, nickel, copper, zinc, and elements directly below them on the Periodic Table. More preferably, the complex includes a Group 8 metal such as iron, cobalt, or nickel. The oxidation number of the Group 8-10 metal is preferably 1+ or 2+, with 2+ being most preferred.

In addition to the Group 3-10 transition or lanthanide metal and isoindoline ligand, the organometallic complex normally includes additional neutral and/or anionic ligands, which may be organic or inorganic. Examples are halides, alkyls, alkoxys, aryloxys, alkylamidos, acetate, acetylacetonate, citrate, nitrate, sulfate, carbonate, tetrafluoroborate, thiocyanate, or the like. The additional ligands of the complex usually derive from the Group 3-10 compound that is used as a source of the metal. In general, any convenient source of the Group 3-10 metal can be used, but transition or lanthanide metal salts are preferred. Particularly preferred are Group 8-10 transition metal salts. Examples include iron(II) chloride, iron(III) chloride, iron (II) acetate, iron(II) sulfate heptahydrate, cobalt(II) chloride, cobalt(II) thiocyanate, cobalt(II) tetrafluoroborate hexahydrate, nickel(II) bromide, nickel(II) acetate, nickel (II) carbonate hydroxide tetrahydrate, nickel(II) acetylacetonate, copper(II) nitrate, zinc acetate, zinc citrate dihydrate, and the like.

The organometallic complex includes an isoindoline ligand. Structurally, isoindolines are condensation products of phthalimides with two equivalents of an aniline or an amino-substituted heteroarene (e.g., 2-aminopyridine or 2-aminothiazole). Isoindolines can be prepared by the condensation reaction suggested above, but they can also be made by other well-established synthetic methods.

In particular, useful isoindoline ligands are 1,3-bis(arylimino)- and 1,3-bis(heteroarylimino)isoindolines. The isoindolines preferably have the structure:

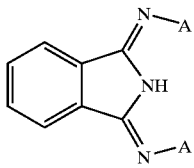

in which A is an aryl or a heteroaryl group, which may or may not be substituted with non-interfering groups (halide, nitro, alkyl, etc.). When A is aryl, it preferably a phenyl or alkyl-substituted phenyl group, such as 4-methylphenyl or 2,4,6-trimethylphenyl (2-mesityl). When A is heteroaryl, it is preferably 2-pyridyl, 2-pyrimidinyl, 4-pyrimidinyl, 2-pyrazinyl, 2-imidazolyl, 2-thiazolyl, or 2-oxazolyl. The aryl and heteroaryl groups can be fused to other rings, as in a 2-naphthyl, 2-benzothiazolyl or 2-benzimidazolyl group. The benzene ring of the isoindoline can also be substituted with groups that do not interfere with preparation of the isoindoline, preparation of the organometallic complex, or olefin polymerization. For example, the benzene ring can be substituted with halide, nitro, alkoxy, thioalkyl, alkyl, or aryl groups, or the like. A few exemplary isoindolines appear below:

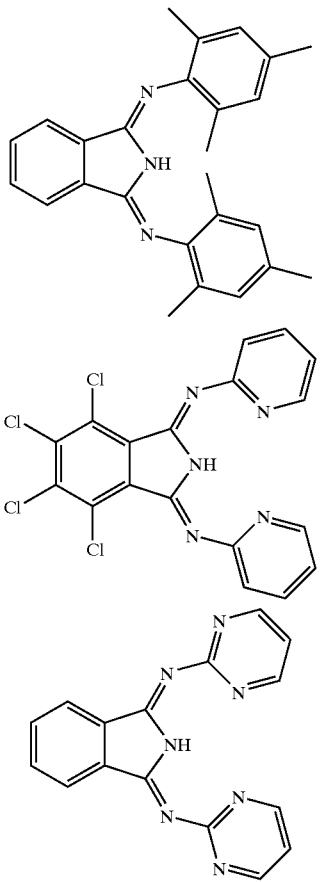

-continued

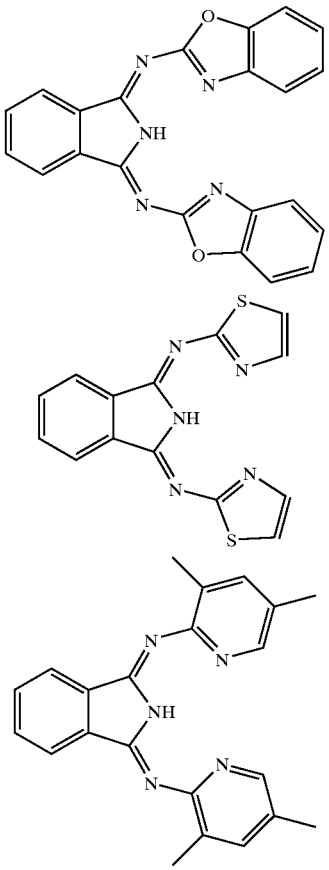

In one approach to making 1,3-bis(arylimino)- or 1,3-bis(heteroarylimino)isoindoline ligands, a phthalimide reacts with two equivalents of an aniline or an amino-substituted heteroarene, optionally in the presence of a condensation catalyst (e.g., formic acid, acetic acid, p-toluenesulfonic acid, or the like). Often, the condensation involves little more than stirring the reactants at room temperature until the isoindoline compound precipitates from the reaction mixture. The first part of Example 2 below is illustrative.

In another approach to making the isoindoline ligands, the aniline or an amino-substituted heteroarene is reacted with a phthalonitrile (a 1,2-dicyanobenzene), preferably in the presence of an alkaline earth salt and an organic solvent, to produce the isoindoline. The reaction is preferably performed at the reflux temperature of the organic solvent, and the isoindoline can be isolated and recrystallized if desired. See, for example, the first part of Example 9 below. More examples of this procedure appear in *J. Org. Chem.* 42 (1977) 1872.

The isoindoline ligand, once prepared, can be reacted with a Group 3-10 transition metal source, usually a salt, to give an organometallic complex. This reaction is also simple. Usually, the isoindoline compound is stirred with a Group 3-10 transition metal compound in an organic solvent, preferably at room temperature, until the organometallic complex forms. Isolation of the complex is straightforward. The second parts of Examples 2 and 9 show typical complex preparations from the ligand.

An alternative method gives the organometallic complex in one reaction step. In this approach, which is illustrated by Examples 1, 3, 5–8, and others, the isoindoline ligand is prepared in the presence of the Group 3-10 transition metal compound. The phthalimide or phthalonitrile is combined with the aniline or amino-substituted heteroarene and the Group 3-10 compound, usually in the presence of a reaction solvent, and the mixture is heated to produce the desired complex. The complex is then isolated and purified by conventional means (stripping, filtration, washing, vacuum drying). The resulting complex is useful without additional purification for polymerizing olefins.

Exact structures of the organometallic complexes have not been completely elucidated, but the complexes incorporate a Group 3-10 metal that is probably coordinated to a 1,3-bis(arylimino)isoindoline or 1,3-bis(heteroarylimino) isoindoline ligand through two or three heteroatoms of the isoindoline. Anionic ligands present in the Group 3-10 transition metal compound are present, at least in part, in the complex. In some cases, the reaction to form the complex may eliminate side products such as HCl acetic acid, or the like.

In preparing catalyst systems of the invention, it is advantageous to utilize a reactor that is equipped with an internal filter. The filter is any device capable of separating two-phase (liquid-solid) reaction mixtures provided that the separation can be accomplished within the reactor and leaves the solid phase in the reactor. Preferably, the filter is depth-flexible, i.e., its depth can be easily extended above or below the surface of the liquid phase in the reactor. While any suitable filtering device can be used, fritted glass is particularly convenient.

In a small-scale, round-bottom flask reactor, the separation might be accomplished by simply inverting the flask and pouring the liquid phase of the reaction mixture through a fritted-glass filter that is built into a sidearm of the reactor. In a preferred approach, the filter is attached to the end of a glass tube. The filter is kept above the surface of the liquid while the complex or ligand is stirred with wash solvent, and it is immersed below the liquid level for solvent removal under reduced pressure. For larger-scale glass or metal reactors, the liquid is often conveniently removed by applying pressure to the reactor contents and draining the liquid through a filter that is built into or is attached to the bottom of the reactor. Many designs for accomplishing this filtration will be readily apparent to those skilled in the art.

Catalyst systems of the invention include an activator. Suitable activators help to ionize the organometallic complex and activate the catalyst for polymerizing olefins. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis (pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

The catalyst systems are optionally used with an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

The catalyst systems are useful for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, these processes are practiced in the liquid phase, which can include slurry, solution, suspension, or bulk processes, or a combination of these. High-pressure fluid phase or gas phase techniques can also be used. Catalysts made by the methods of the invention are particularly valuable for use in solution and slurry processes.

The olefin polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

EXAMPLE 1

Preparation of an Iron(II) 1,3-Bis(2-mesitylimino) isoindoline Complex

A 100-mL round-bottom flask equipped with a nitrogen inlet and an internal fritted-glass filter is charged with phthalimide (2.94 g, 20.0 mmol) and ethyl acetate (60 mL). (The fritted-glass filter is attached to the end of a glass tube, which is inserted into the reactor through a rubber septum. The filter is easily raised above or lowered below the surface of liquids in the reactor.) 2,4,6-Trimethylaniline (5.41 g, 40.0 mmol, 2.0 eq.) and iron(II) chloride (2.54 g, 20.0 mmol) are added to the flask, and the mixture is stirred under nitrogen at room temperature for 1 h. The yellow mixture is heated to reflux (77° C.) for 10 h, and is then stirred at room temperature for 32 h. A brown precipitate forms. The reaction mixture is concentrated by stripping out the ethyl acetate under a stream of nitrogen. Cold diethyl ether (30 mL) is added to the residue, and the mixture is stirred to wash the residue. The glass filter is immersed in the liquid phase, which is then removed at reduced pressure through the internal filter. The solids are dried under vacuum for 2 h to give a brown powder. Yield: 10.11 g (99.4%).

EXAMPLE 2

Preparation of an Iron(II) 1,3-Bis(2-mesitylimino) isoindoline Complex

A 100-mL round-bottom flask equipped with a nitrogen inlet and an internal fritted-glass filter is charged with phthalimide (2.94 g, 20.0 mmol) and methanol (50 mL). 2,4,6-Trimethylaniline (5.41 g, 40.0 mmol, 2.0 eq.) and formic acid (3 drops) are added. The solution is stirred at room temperature under nitrogen for 120 h, and a yellow precipitate is observed. The reaction solvent is stripped, and the solids are dried under vacuum in the reactor flask for 1 h.

Dry tetrahydrofuran (30 mL) and iron(II) chloride (2.54 g, 20.0 mmol) are added to the flask containing the 1,3-bis(arylimino)isoindoline compound, and the mixture is stirred for 24 h under nitrogen at room temperature. The liquid phase is removed by filtration, and the solids are dried under vacuum for 1 h to give a yellow-brown powder. Yield: 9.45 g (92.9%).

EXAMPLE 3

Preparation of an Iron(II) 1,3-Bis(2-mesitylimino) isoindoline Complex

A 100-mL round-bottom flask equipped with a nitrogen inlet and an internal fritted-glass filter is charged with phthalonitrile (2.56 g, 20.0 mmol) and ethanol (50 mL). 2,4,6-Trimethylaniline (5.68 g, 42.0 mmol, 2.1 eq.) and iron(II) chloride (2.54 g, 20.0 mmol) are added to the flask, and the mixture is stirred at room temperature under nitrogen for 1 h.

A portion of the reaction mixture (6.5 mL) is transferred to a 100-mL round-bottom flask, and the mixture is heated to reflux (78° C.) for 24 h. The mixture color changes from yellow to brown. After cooling to room temperature, the mixture is filtered. The solids are washed with cold ethanol (20 mL), and dried under vacuum for 1 h to give a dark-brown powder. Yield: 1.12 g (88.2%).

EXAMPLE 4

Preparation of an Iron(II) 1,3-Bis(2-mesitylimino) isoindoline Complex

A second portion of the initial reaction mixture from Example 3 (13.0 mL) is transferred to a 100-mL round-bottom flask, and the mixture is stirred at room temperature under nitrogen for 120 h. The mixture color changes from yellow to brown. The mixture is filtered. The solids are washed with cold ethanol (20 mL), and dried under vacuum for 1 h to give a dark-brown powder. Yield: 2.28 g (89.8%).

EXAMPLE 5

Preparation of an Iron(II) 1,3-Bis(2-pyridylimino) isoindoline Complex

A 100-mL round-bottom flask equipped with a nitrogen inlet and an internal fritted-glass filter is charged with phthalimide (2.94 g, 20.0 mmol) and ethyl acetate (50 mL). 2-Aminopyridine (3.77 g, 40.0 mmol, 2.1 eq.) and iron(II) chloride (2.54 g, 20.0 mmol) are added to the flask, and the mixture is stirred under nitrogen at room temperature for 1 h. The mixture is stirred at room temperature for 120 h, yielding a white precipitate.

Samples are removed from the bottom of the flask at 24, 48, and 120 h. Each sample is dried under vacuum for 0.5 h, and a small portion of each (40 mg) is dissolved in toluene (20 mL) and tested in an ethylene polymerization experiment. (Polymerization results for the 24 h sample appear in Table 1.) The rest of the reaction mixture is stripped under vacuum after the 120 h stirring period. After washing with cold diethyl ether (3×20 mL), the white solids are dried under vacuum for 1 h. Total yield: 8.40 g (98.6%).

EXAMPLE 6

Preparation of an Iron(II) 1,3-Bis(2-pyridylimino) isoindoline Complex

A 100-mL round-bottom flask equipped with a nitrogen inlet and an internal fritted-glass filter is charged with phthalonitrile (2.56 g, 20.0 mmol) and ethyl acetate (50 mL). 2-Aminopyridine (3.77 g, 40.0 mmol, 2.1 eq.) and iron(II) chloride (2.54 g, 20.0 mmol) are added to the flask, and the mixture is stirred under nitrogen at room temperature for 1 h. The mixture is stirred at room temperature for 120 h, yielding a white precipitate.

Samples are removed from the bottom of the flask at 48 and 120 h. Each sample is dried under vacuum for 0.5 h, and a small portion of each (40 mg) is dissolved in toluene (20 mL) and tested in an ethylene polymerization experiment. (Polymerization results for the 48 h sample appear in Table 1.) The rest of the reaction mixture is stripped under vacuum after the 120 h stirring period. After washing with cold diethyl ether (20 mL), the white solids are dried under vacuum for 1 h. Total yield: 5.80 g (68.2%).

EXAMPLE 7

Preparation of a Nickel(II) 1,3-Bis(2-mesitylimino) isoindoline Complex

A 100-mL round-bottom flask equipped as described earlier is charged with phthalimide (2.94 g, 20.0 mmol) and ethyl acetate (60 mL). 2,4,6-Trimethylaniline (5.41 g, 40.0 mmol, 2.0 eq.) and nickel(II) chloride (2.63 g, 20.0 mmol) are added to the flask, and the mixture is stirred under nitrogen at room temperature for 24 h. A brown precipitate forms. The reaction mixture is concentrated by stripping out the ethyl acetate under a stream of nitrogen. Cold diethyl ether (30 mL) is added to the residue, and the mixture is stirred to wash the residue. The liquid phase is removed at reduced pressure through the internal filter. The solids are dried under vacuum for 2 h to give a brown powder. Yield: 9.60 g (93.8%). Ethylene is polymerized as described below. Catalyst activity: 850 kg polymer/g Ni/h. The polyethylene has MI=30, MIR=28. DSC properties: $T_m$=128.7° C.; crystallinity=82%.

EXAMPLE 8

Preparation of a Nickel(II) 1,3-Bis(2-pyridylimino) isoindoline Complex

The procedure of Example 7 is followed, except that 2-aminopyridine (3.77 g, 40.0 mmol, 2.0 eq.) is used instead of 2,4,6-trimethylaniline. The product is a brown powder. Yield: 7.9 g (92%). Ethylene is polymerized as described below. Catalyst activity: 1500 kg polymer/g Ni/h. The polyethylene has MI=1.12, MIR=180. DSC properties: $T_m$=131.5° C.; crystallinity=84%.

Ethylene Polymerization

The catalysts prepared in Examples 1–8 are tested as follows. All polymerizations are performed at 80° C. in a 2-liter slurry reactor using isobutane as a solvent. The reactor is pre-conditioned by heating it to 120° C. and holding it at that temperature for 20 min. under a nitrogen purge. Ethylene, isobutane, hydrogen, and nitrogen are dried prior to use with 13× molecular sieves.

For a typical polymerization, the desired amount of hydrogen ($\Delta P$=5 psi) is added to the reactor by monitoring the pressure drop from a 300-mL steel vessel pressurized with hydrogen. Then, isobutane (550 mL) is charged into the reactor. Ethylene is introduced into the reactor on demand using a Brooks mass flow meter set at 400 psi. In the reactor, ethylene pressure is 290 psi (about 20 bar), and hydrogen pressure is 5 psi. The concentration of ethylene in isobutane is about 15 mol %.

A small amount of triisobutylaluminum solution (2.7 mL of 1.0 M solution in hexane) is charged from a first injector into the reactor to scavenge trace amounts of moisture in the system. The desired amounts of catalyst (2 mg of complex in 1.0 mL of toluene solution) and cocatalyst (MAO solution in toluene; [Al:Fe] molar ratio=100) are then added to the reactor from a second injector to initiate the polymerization. The reactor is kept at 80° C. throughout the polymerization. When the reaction is completed (15 to 60 min.), the reactor is vented and the resulting polyethylene is collected and dried at 50° C. under vacuum. Catalyst activities and polymer properties are reported in Table 1.

EXAMPLE 9

Preparation of an Iron(II) 1,3-Bis(2-pyridylimino) isoindoline Complex

A 100-mL round-bottom flask equipped with a nitrogen inlet and an internal fritted-glass filter is charged with phthalonitrile (2.56 g, 20.0 mmol), calcium chloride (0.11 g, 1.0 mmol), and 1-butanol (50 mL). 2-Aminopyridine (3.95 g, 42.0 mmol, 2.1 eq.) is added, and the mixture is heated to reflux (118° C.) for 48 h. The mixture is concentrated by vacuum stripping and is allowed to cool. The residue is washed with cold water (20 mL), dried under vacuum, and is recrystallized from ethanol-water (9:1).

Tetrahydrofuran (30 mL) and iron(II) chloride (2.54 g, 20.0 mmol) are added to the flask containing the isoindoline compound, and the mixture is stirred for 24 h under nitrogen at room temperature. The mixture is concentrated, and the residue is washed with cold diethyl ether (20 mL) and dried under vacuum for 2 h. The resulting complex is expected to

TABLE 1

Ethylene Polymerization Results

| Catalyst from Ex: | 1 | 2 | 3 | 4 | 5 | 6 |
|---|---|---|---|---|---|---|
| Starter type | imide | imide | nitrile | nitrile | imide | nitrile |
| Amine reactant | 2-mesityl | 2-mesityl | 2-mesityl | 2-mesityl | 2-pyridyl | 2-pyridyl |
| Catalyst yield, % | 99.4 | 92.9 | 88.2 | 89.8 | 98.6 | 68.2 |
| Activity, kg/g Fe/h | 850 | 860 | 780 | 930 | 2100 | 1050 |
| Polymer Properties | | | | | | |
| Density, g/cm$^3$ | 0.968 | 0.968 | 0.968 | 0.971 | 0.969 | 0.966 |
| Melt index (MI) | 2.0 | 1.9 | 3.3 | 5.8 | 6.5 | 1.5 |
| MIR(HLMI/MI) | 59 | 63 | 66 | 64 | 71 | 87 |
| Mw | 152 K | 221 K | 111 K | 90 K | 83 K | 140 K |
| Mw/Mn | 15 | 12 | 13 | 11 | 15 | 14 |
| Er$^1$ | 2.4 | 3.2 | 3.4 | 2.4 | 2.9 | 3.0 |
| Tm$^2$ | 133.6 | 133.8 | 132.6 | 133.1 | 132.0 | 132.8 |
| Crystallinity$^3$, % | 79 | 76 | 79 | 82 | 92 | 82 |

$^1$ASTM D 4440-95A.
$^{2,3}$From differential scanning calorimetry.
HLMI = high-load melt index.

As the results demonstrate, all of the catalysts tested exhibited excellent activity and produced high molecular weight polyethylene having a broad molecular weight distribution. All produced polyethylene with high density (>0.965 g/cm$^3$) and a high degree of crystallinity (>75%). When prepared and used under similar conditions, the iron bis(imine) catalysts of the prior art have activities of about 750–800 kg polymer/g Fe/h. Interestingly, the iron(II) 1,3-bis(2-pyridylimino)-isoindoline complex of Example 5, when activated by MAO, had an activity of over 2000 kg polymer/g Fe/h, which is more than double the activity of the best known late transition metal catalysts. In addition, the resulting polyethylene had an exceptionally high degree of crystallinity (92%).

Rheological properties of the polymers were also tested and compared with commercial HDPE resins used in packaging films. The melt viscosity versus shear rate plot is linear and aligned with the plot obtained from commercial resins. In contrast, a polymer produced from a typical iron(II) bis(imine) complex exhibits nonlinear, relatively low viscosity at low shear rates (0.01 to 1 rad/sec), making it less suitable for packaging films.

The following examples show how to make additional complexes useful for catalyst systems of the invention.

be an active olefin polymerization catalyst when used with an activator as described above.

EXAMPLE 10

Preparation of an Iron(II) 1,3-Bis(3,5-dichloro-2-pyridylimino)isoindoline Complex The procedure of Example 9 is followed, except that 3,5-dichloro-2-aminopyridine (6.85 g, 42.0 mmol) is used instead of 2-aminopyridine. The resulting complex is expected to be an active olefin polymerization catalyst when used with an activator as described above.

EXAMPLE 11

Preparation of a Nickel(II) 1,3-Bis(2-pyridylimino) isoindoline Complex

A 100-mL round-bottom flask equipped with a nitrogen inlet and an internal fritted-glass filter is charged with phthalonitrile (1.28 g, 10.0 mmol), nickel(II) acetate tetrahydrate (2.49 g, 10.0 mmol), and ethanol (50 mL). 2-Aminopyridine (1.98 g, 21.0 mmol, 2.1 eq.) is added, and the mixture is heated to reflux (78° C.) for 24 h. The mixture is concentrated by vacuum stripping and is allowed to cool. The residue is washed with cold diethyl ether (30 mL) and dried under vacuum for 2 h. The resulting complex is expected to be an active olefin polymerization catalyst when used with an activator as described above.

EXAMPLE 12

Preparation of an Iron(II) 1,3-Bis(2-thiazolylimino) isoindoline Complex

The procedure of Example 9 is followed, except that 2-aminothiazole (4.20 g, 42.0 mmol, 2.1 eq.) is used instead of 2-aminopyridine. The resulting complex is expected to be an active olefin polymerization catalyst when used with an activator as described above.

EXAMPLE 13

Preparation of a Nickel(II) 1,3-Bis(2-thiazolylimino)isoindoline Complex

The procedure of Example 11 is followed, except that 2-aminothiazole (2.10 g, 21.0 mmol, 2.1 eq.) is used instead of 2-aminopyridine. The resulting complex is expected to be an active olefin polymerization catalyst when used with an activator as described above.

EXAMPLE 14

Preparation of an Iron(II) 1,3-Bis(2-thiazolylimino) isoindoline Complex

The procedure of Example 6 is followed, except that 2-aminothiazole (4.20 g, 42.0 mmol, 2.1 eq) is used instead of 2-aminopyridine, and the mixture is stirred at room temperature for a total of 24 h. The resulting complex is expected to be an active olefin polymerization catalyst when used with an activator as described above.

EXAMPLE 15

Preparation of a Cobalt(II) 1,3-Bis(2-benzimidazolylimino)isoindoline Complex

The procedure of Example 14 is followed, except that 2-aminobenzimidazole (5.59 g, 42.0 mmol, 2.1 eq.) is used instead of 2-aminothiazole, and cobalt(II) chloride (2.60 g, 20.0 mmol) is used instead of iron(II) chloride. The resulting complex is expected to be an active olefin polymerization catalyst when used with an activator as described above.

EXAMPLE 16

Preparation of a Nickel(II) 1,3-Bis(2-benzothiazolylimino)isoindoline Complex

The procedure of Example 11 is followed, except that 2-aminobenzothiazole (3.15 g, 21.0 mmol, 2.1 eq.) is used instead of 2-aminopyridine. The resulting complex is expected to be an active olefin polymerization catalyst when used with an activator as described above.

EXAMPLE 17

Preparation of an Iron(II) 1,3-Bis(2-pyrimidinylimino)isoindoline Complex

The procedure of Example 6 is followed, except that 2-aminopyrimidine (3.99 g, 42.0 mmol, 2.1 eq) is used instead of 2-aminopyridine, and the mixture is stirred at room temperature for a total of 24 h. The resulting complex is expected to be an active olefin polymerization catalyst when used with an activator as described above.

EXAMPLE 18

Preparation of an Iron(II) 1,3-Bis(2-pyrimidinylimino)isoindoline Complex

A modification of the procedure of Baird et al. (*Polyhedron*, 10 (1991) 229) is used. Thus, a 100-mL round-bottom flask equipped with a nitrogen inlet and an internal fritted-glass filter is charged with phthalonitrile (2.56 g, 20.0 mmol), calcium chloride (0.11 g, 1.0 mmol), and 1-butanol (50 mL). 2-Aminopyrimidine (3.99 g, 42.0 mmol, 2.1 eq.) is added, and the mixture is heated to reflux (118° C.) for 7 days. The mixture is concentrated by vacuum stripping and is allowed to cool. The mixture is filtered, and the solids are combined with chloroform (15 mL). Undissolved solids are removed, and the filtrate is combined with an equal portion of n-heptane. The mixture is chilled to precipitate the desired bis(pyrimidinylimino)isoindoline compound, which is filtered and dried under vacuum for 2 h.

Tetrahydrofuran (30 mL) and iron(II) chloride (2.54 g, 20.0 mmol) are added to the flask containing the isoindoline compound, and the mixture is stirred for 24 h under nitrogen at room temperature. The mixture is concentrated, washed with cold diethyl ether (20 mL), and dried under vacuum for 2 h. The resulting complex is expected to be an active olefin polymerization catalyst when used with an activator as described above.

The preceding examples are meant only as illustrations. The following claims define the invention.

We claim:

1. A catalyst system, useful for polymerizing olefins, which comprises:
    (a) an activator; and
    (b) an organometallic complex comprising:
        (i) a Group 3-10 transition or lanthanide metal; and
        (ii) a 1,3-bis(arylimino)isoindoline or 1,3-bis(heteroarylimino)isoindoline ligand.

2. The catalyst system of claim 1 wherein the activator is selected from the group consisting of alkyl alumoxanes, alkylaluminum compounds, aluminoboronates, organoboranes, ionic borates, and ionic aluminates.

3. A supported catalyst system of claim 1.

4. The catalyst system of claim 1 wherein the 1,3-bis (arylimino)-isoindoline has the structure:

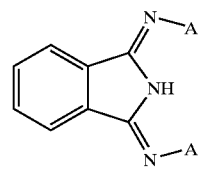

in which each A is independently phenyl or alkyl-substituted phenyl.

5. The catalyst system of claim 1 wherein the 1,3-bis (arylimino)-isoindoline is 1,3-bis(2-mesitylimino) isoindoline.

6. The catalyst system of claim 1 wherein the bis (heteroarylimino)isoindoline has the structure:

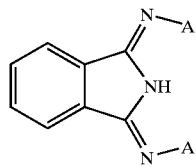

in which each A is independently selected from the group consisting of 2-pyridyl, 2-pyrimidinyl, 4-pyrimidinyl, 2-pyrazinyl, 2-imidazolyl, 2-thiazolyl, and 2-oxazolyl.

7. The catalyst system of claim 1 wherein the bis(heteroaryl-imino)isoindoline is 1,3-bis(2-pyridylimino)isoindoline.

8. A process which comprises polymerizing an olefin in the presence of the catalyst system of claim 1.

9. A process which comprises polymerizing ethylene with at least one alpha-olefin in the presence of the catalyst system of claim 1.

10. A catalyst system, useful for polymerizing olefins, which comprises:

(a) an activator; and
(b) an organometallic complex comprising:
   (i) a Group 8-10 transition metal; and
   (ii) a 1,3-bis(arylimino)isoindoline or 1,3-bis(heteroarylimino)isoindoline ligand.

11. The catalyst system of claim 10 wherein the activator is selected from the group consisting of alkyl alumoxanes, alkylaluminum compounds, aluminoboronates, organoboranes, ionic borates, and ionic aluminates.

12. The catalyst system of claim 10 wherein the transition metal is iron, nickel, or cobalt.

13. A supported catalyst system of claim 10.

14. The catalyst system of claim 10 wherein the 1,3-bis(arylimino)-isoindoline has the structure:

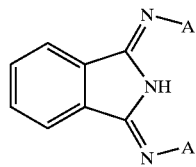

in which each A is independently phenyl or alkyl-substituted phenyl.

15. The catalyst system of claim 10 wherein the 1,3-bis(arylimino)-isoindoline is 1,3-bis(2-mesitylimino)isoindoline.

16. The catalyst system of claim 10 wherein the bis(heteroarylimino)isoindoline has the structure:

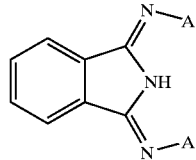

in which each A is independently selected from the group consisting of 2-pyridyl, 2-pyrimidinyl, 4-pyrimidinyl, 2-pyrazinyl, 2-imidazolyl, 2-thiazolyl, and 2-oxazolyl.

17. The catalyst system of claim 10 wherein the bis(heteroaryl-imino)isoindoline is 1,3-bis(2-pyridylimino)isoindoline.

18. A process which comprises polymerizing an olefin in the presence of the catalyst system of claim 10.

19. A process which comprises polymerizing ethylene with at least one alpha-olefin in the presence of the catalyst system of claim 10.

* * * * *